US011337035B1

(12) United States Patent
Wirola et al.

(10) Patent No.: US 11,337,035 B1
(45) Date of Patent: May 17, 2022

(54) SELECTIVE ENABLING OF OFFLINE POSITIONING

(71) Applicant: HERE Global B.V., Eindhoven (NL)

(72) Inventors: Lauri Aarne Johannes Wirola, Tampere (FI); Petri Rauhala, Tampere (FI); Marko Luomi, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/079,654

(22) Filed: Oct. 26, 2020

(51) Int. Cl.
*H04W 4/029* (2018.01)
*G01S 5/02* (2010.01)

(52) U.S. Cl.
CPC ........... *H04W 4/029* (2018.02); *G01S 5/0284* (2013.01)

(58) Field of Classification Search
None
See application file for complete search history.

(56) References Cited

U.S. PATENT DOCUMENTS

| 8,369,264 B2 | 2/2013 | Bracket et al. |
| 8,660,577 B2 | 2/2014 | Ledlie |
| 9,063,208 B2 | 6/2015 | Wuoti et al. |
| 9,535,154 B2 | 1/2017 | Natucci et al. |
| 2015/0189467 A1* | 7/2015 | Alsehly ................ G01S 5/0236 455/456.1 |
| 2016/0227367 A1* | 8/2016 | Alsehly ................ H04W 4/025 |
| 2017/0026909 A1 | 1/2017 | Gao et al. |

FOREIGN PATENT DOCUMENTS

WO  WO-2019/034240 A1  2/2019

* cited by examiner

*Primary Examiner* — Adolf Dsouza
(74) *Attorney, Agent, or Firm* — Alston & Bird LLP

(57) ABSTRACT

A network device receives a positioning request associated with a computing device; determines a position estimate of the computing device responsive to the positioning request and based at least in part on at least a portion of a positioning map; and determines whether an offline positioning enablement trigger has been identified. Responsive to determining that the offline positioning enablement trigger has been identified, the network device generates a positioning response that comprises the position estimate and information enabling offline positioning of the computing device at least at a location of the position estimate and provides the positioning response such that the computing device receives the positioning response.

20 Claims, 4 Drawing Sheets

SELECTIVE ENABLING OF OFFLINE POSITIONING

TECHNOLOGICAL FIELD

An example embodiment relates generally to positioning. In particular, an example embodiment generally relates to enabling offline positioning.

BACKGROUND

In various scenarios, a computing device may need to determine the location of the computing device. For example, the computing device may be determining a route from a current location to a destination location, providing information regarding points of interest (POIs) in the vicinity of the computing device, or displaying a map of the vicinity of the computing device.

BRIEF SUMMARY

Various embodiments provide methods, apparatus, systems, and computer program products for selectively enabling a computing device to perform selective offline positioning. Positioning, the determining of a location of a computing device, can function in two different modes. The first mode is an online positioning mode, in which the computing device provides a positioning request to a remote network device. The network device determines a position of the computing device and returns the position to the computing device. The online positioning mode requires that the computing device have data connectivity whenever the computing device wants to position itself. The second mode is an offline positioning mode, in which the computing device uses locally stored information to determine the position of the computing device. The offline positioning mode requires use of more local storage and the locally stored information may be outdated unless regularly updated.

In various embodiments, a computing device may identify a positioning trigger and provide a positioning request. A network device may receive the positioning request and determine a position estimate for the location of the computing device. The network device may then determine whether an offline positioning enabling trigger corresponding to the computing device has been identified. When the network device determines that an offline positioning enabling trigger has been identified, the network device may generate a positioning response that includes the position estimate for the location of the computing device and information that the computing device may use to perform offline positioning near the computing device's current position. When the network device determines that the offline positioning enabling trigger has not been identified, the network device may generate a positioning response that includes the position estimate for the location of the computing device, but that does not include the information that the computing device may use to perform offline positioning near the computing device's current position. In various embodiments, the offline positioning enabling trigger may be configured to control a number of positioning requests received by the network device and/or an amount of resources used by the network device to respond to positioning requests.

In an example embodiment, a network device receives a positioning request associated with a computing device. The network device determines a position estimate of the computing device responsive to the positioning request and based at least in part on at least a portion of a positioning map. The network device determines whether an offline positioning enablement trigger has been identified and, responsive to determining that the offline positioning enablement trigger has been identified, generates a positioning response that comprises the position estimate and information enabling offline positioning of the computing device at least at a location of the position estimate. The network device provides the positioning response such that the computing device receives the positioning response.

According to an aspect of the present disclosure, a method selectively enabling offline positioning of a computing device is provided. In an example embodiment, the method comprises receiving, by a network device, a positioning request associated with a computing device; determining, by the network device, a position estimate of the computing device responsive to the positioning request and based at least in part on at least a portion of a positioning map; and determining, by the network device, whether an offline positioning enablement trigger has been identified. The method further comprises, responsive to determining that the offline positioning enablement trigger has been identified, generating, by the network device, a positioning response that comprises the position estimate and information enabling offline positioning of the computing device at least at a location of the position estimate; and providing, by the network device, the positioning response such that the computing device receives the positioning response.

In an example embodiment, the information enabling offline positioning of the computing device at least at the location of the position estimate comprises at least part of the at least a portion of the positioning map. In an example embodiment, the at least a portion of the positioning map comprises one or more access point models. In an example embodiment, an access point model of the one or more access point models comprises at least one of (a) a location of a corresponding access point, (b) a description of a coverage area of the corresponding access point, (c) an expected path loss for a signal generated by the corresponding access point, or (d) an expected signal strength for the signal generated by the corresponding access point. In an example embodiment, the method further comprises filtering the one or more access point models provided in the information enabling offline positioning based on at least one of (a) a status associated with each respective access point model, (b) an importance score of each respective access point model in determining the position of the computing device, (c) a frequency of used of each respective access point model, (d) a cost of use of each respective access point model, (e) access point models previously provided such that the computing device received the access point models, or (f) based on a comparison of coverage areas of at least two of the one or more access point models. In an example embodiment, identifying the offline positioning enablement trigger comprises determining that at least a particular number of positioning requests corresponding to the computing device have been received within a particular time frame. In an example embodiment, identifying the offline positioning enablement trigger comprises determining that a positioning request criteria corresponding to the computing device has been satisfied. In an example embodiment, identifying the offline positioning enablement trigger comprises determining that a cost associated with responding to positioning requests corresponding to the computing device during a particular time frame satisfies a cost threshold criteria. In an example embodiment, the computing device stores the information enabling offline positioning in local memory for use in one or more positioning-related functions. In an example embodiment, the computing device assigns the information enabling offline positioning a short-time-to-live in local memory for use in one or more positioning-related functions. In an example embodiment, the information enabling offline positioning comprises a flag indicating that the information enabling offline positioning comprises an incomplete or unstable access point model and the information enabling offline positioning is assigned the short-time-to-live in the local memory based on the flag. In an example embodiment, the information enabling offline positioning is assigned the short-time-to-live in the local memory based at least in part on a frequency with which the computing device visits a geographical area corresponding to the information enabling offline positioning.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least receive, via the communications interface, a positioning request associated with a computing device; determine a position estimate of the computing device responsive to the positioning request and based at least in part on at least a portion of a positioning map; determine whether an offline positioning enablement trigger has been identified; responsive to determining that the offline positioning enablement trigger has been identified, generate a positioning response that comprises the position estimate and information enabling offline positioning of the computing device at least at a location of the position estimate; and provide, via the communications interface, the positioning response such that the computing device receives the positioning response.

In an example embodiment, the information enabling offline positioning of the computing device at least at the location of the position estimate comprises at least part of the at least a portion of the positioning map. In an example embodiment, the at least a portion of the positioning map comprises one or more access point models. In an example embodiment, an access point model of the one or more access point models comprises at least one of (a) a location of a corresponding access point, (b) a description of a coverage area of the corresponding access point, (c) an expected path loss for a signal generated by the corresponding access point, or (d) an expected signal strength for the signal generated by the corresponding access point. In an example embodiment, the at least one memory and the computer program code are further configured to, with the processor, cause the apparatus to at least filter the one or more access point models provided in the information enabling offline positioning based on at least one of (a) a status associated with each respective access point model, (b) an importance score of each respective access point model in determining the position of the computing device, (c) a frequency of used of each respective access point model, (d) a cost of use of each respective access point model, (e) access point models previously provided such that the computing device received the access point models, or (f) based on a comparison of coverage areas of at least two of the one or more access point models. In an example embodiment, identifying the offline positioning enablement trigger comprises determining that at least a particular number of positioning requests corresponding to the computing device have been received within a particular time frame. In an example embodiment, identifying the offline positioning enablement trigger comprises determining that a positioning request criteria corresponding to the computing device has been satisfied. In an example embodiment, identifying the offline positioning enablement trigger comprises determining that a cost associated with responding to positioning requests corresponding to the computing device during a particular time frame satisfies a cost threshold criteria. In an example embodiment, the computing device stores the information enabling offline positioning in local memory for use in one or more positioning-related functions. In an example embodiment, the computing device assigns the information enabling offline positioning a short-time-to-live in local memory for use in one or more positioning-related functions. In an example embodiment, the information enabling offline positioning comprises a flag indicating that the information enabling offline positioning comprises an incomplete or unstable access point model and the information enabling offline positioning is assigned the short-time-to-live in the local memory based on the flag. In an example embodiment, the information enabling offline positioning is assigned the short-time-to-live in the local memory based at least in part on a frequency with which the computing device visits a geographical area corresponding to the information enabling offline positioning.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive, via a communications interface of the apparatus, a positioning request associated with a computing device; determine a position estimate of the computing device responsive to the positioning request and based at least in part on at least a portion of a positioning map; determine whether an offline positioning enablement trigger has been identified; responsive to determining that the offline positioning enablement trigger has been identified, generate a positioning response that comprises the position estimate and information enabling offline positioning of the computing device at least at a location of the position estimate; and provide, via the communications interface, the positioning response such that the computing device receives the positioning response.

In an example embodiment, the information enabling offline positioning of the computing device at least at the location of the position estimate comprises at least part of the at least a portion of the positioning map. In an example embodiment, the at least a portion of the positioning map comprises one or more access point models. In an example embodiment, an access point model of the one or more access point models comprises at least one of (a) a location of a corresponding access point, (b) a description of a coverage area of the corresponding access point, (c) an expected path loss for a signal generated by the corresponding access point, or (d) an expected signal strength for the signal generated by the corresponding access point. In an example embodiment, the computer-readable program code portions comprise executable portions configured, when executed by the processor of the apparatus, to cause the apparatus to filter the one or more access point models provided in the information enabling offline positioning based on at least one of (a) a status associated with each respective access point model, (b) an importance score of each respective access point model in determining the position of the computing device, (c) a frequency of used of each respective access point model, (d) a cost of use of each respective access point model, (e) access point models previously provided such that the computing device received the access point models, or (f) based on a comparison of coverage areas of at least two of the one or more access point models. In an example embodiment, identifying the offline positioning enablement trigger comprises determining that at least a particular number of positioning requests corresponding to the computing device have been received within a particular time frame. In an example embodiment, identifying the offline positioning enablement trigger comprises determining that a positioning request criteria corresponding to the computing device has been satisfied. In an example embodiment, identifying the offline positioning enablement trigger comprises determining that a cost associated with responding to positioning requests corresponding to the computing device during a particular time frame satisfies a cost threshold criteria. In an example embodiment, the computing device stores the information enabling offline positioning in local memory for use in one or more positioning-related functions. In an example embodiment, the computing device assigns the information enabling offline positioning a short-time-to-live in local memory for use in one or more positioning-related functions. In an example embodiment, the information enabling offline positioning comprises a flag indicating that the information enabling offline positioning comprises an incomplete or unstable access point model and the information enabling offline positioning is assigned the short-time-to-live in the local memory based on the flag. In an example embodiment, the information enabling offline positioning is assigned the short-time-to-live in the local memory based at least in part on a frequency with which the computing device visits a geographical area corresponding to the information enabling offline positioning.

According to yet another aspect of the present disclosure, an apparatus is provided. In an example embodiment, the apparatus comprises means for receiving a positioning request associated with a computing device. The apparatus comprises means for determining a position estimate of the computing device responsive to the positioning request and based at least in part on at least a portion of a positioning map. The apparatus comprises means for determining whether an offline positioning enablement trigger has been identified. The apparatus comprises means for, responsive to determining that the offline positioning enablement trigger has been identified, generating a positioning response that comprises the position estimate and information enabling offline positioning of the computing device at least at a location of the position estimate. The apparatus comprises means for providing the positioning response such that the computing device receives the positioning response.

BRIEF DESCRIPTION OF THE DRAWINGS

Figure 1:
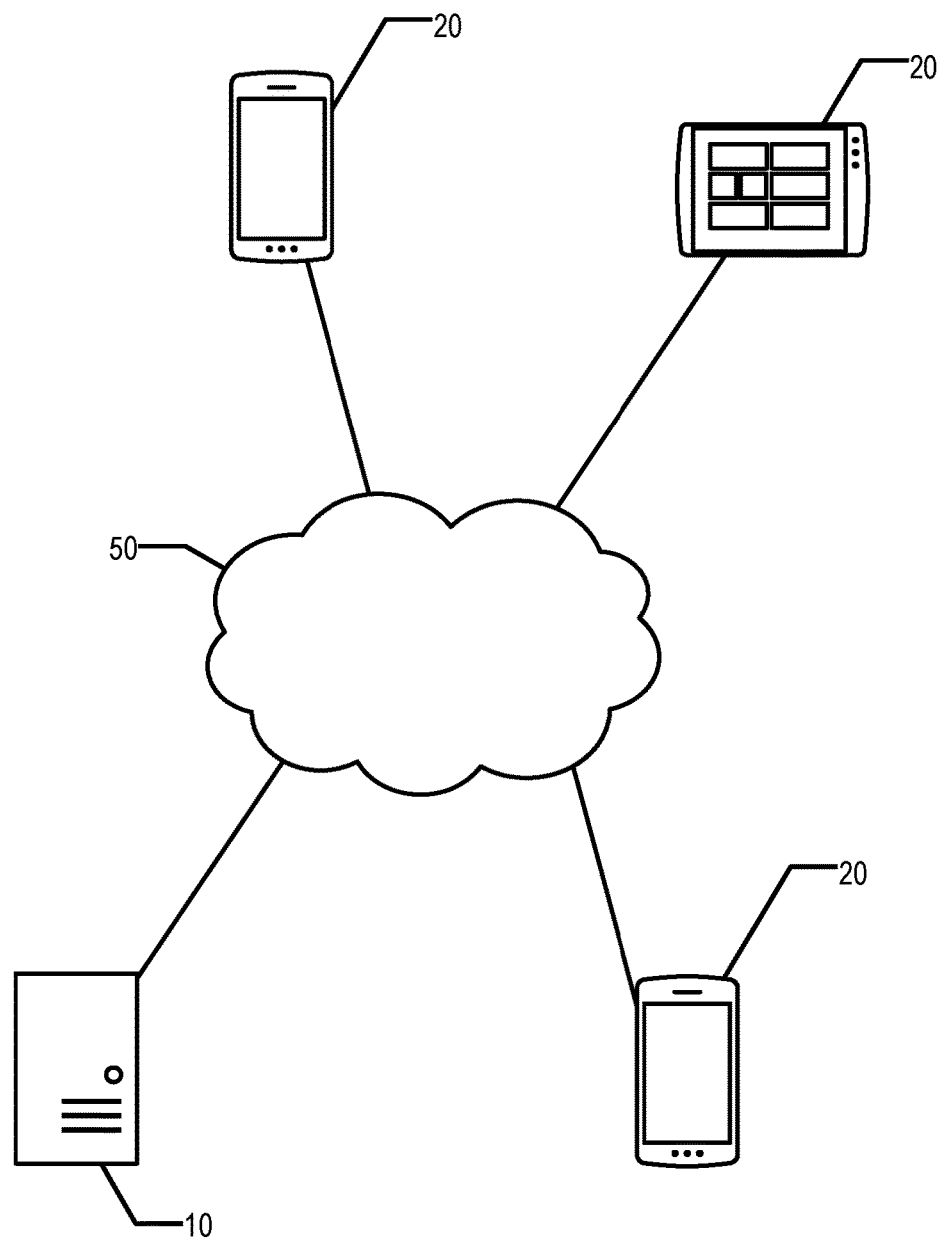
Figure 2:
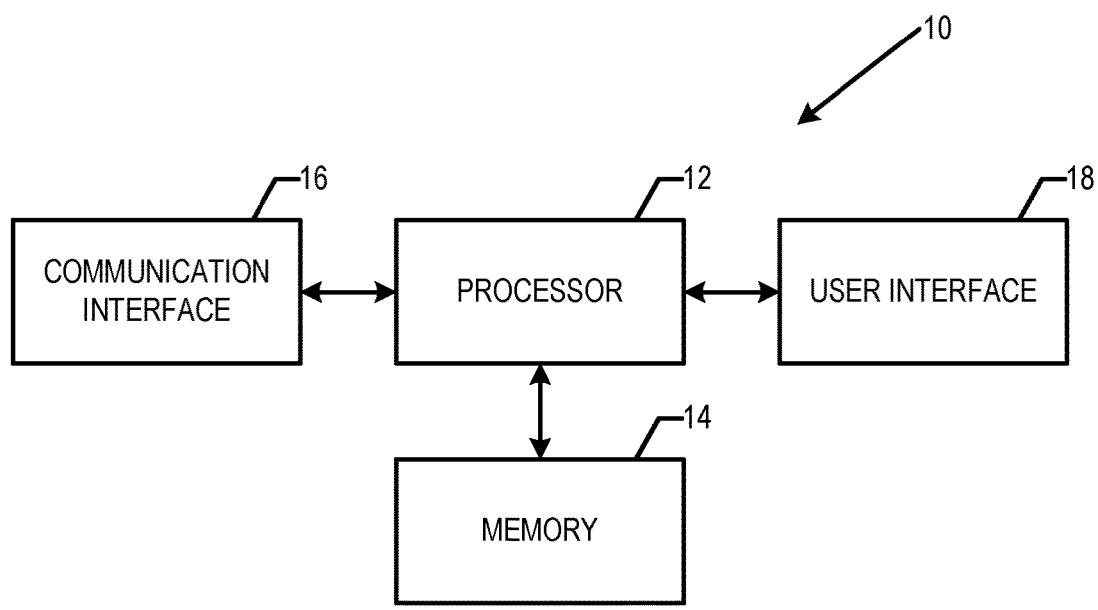
Figure 3:
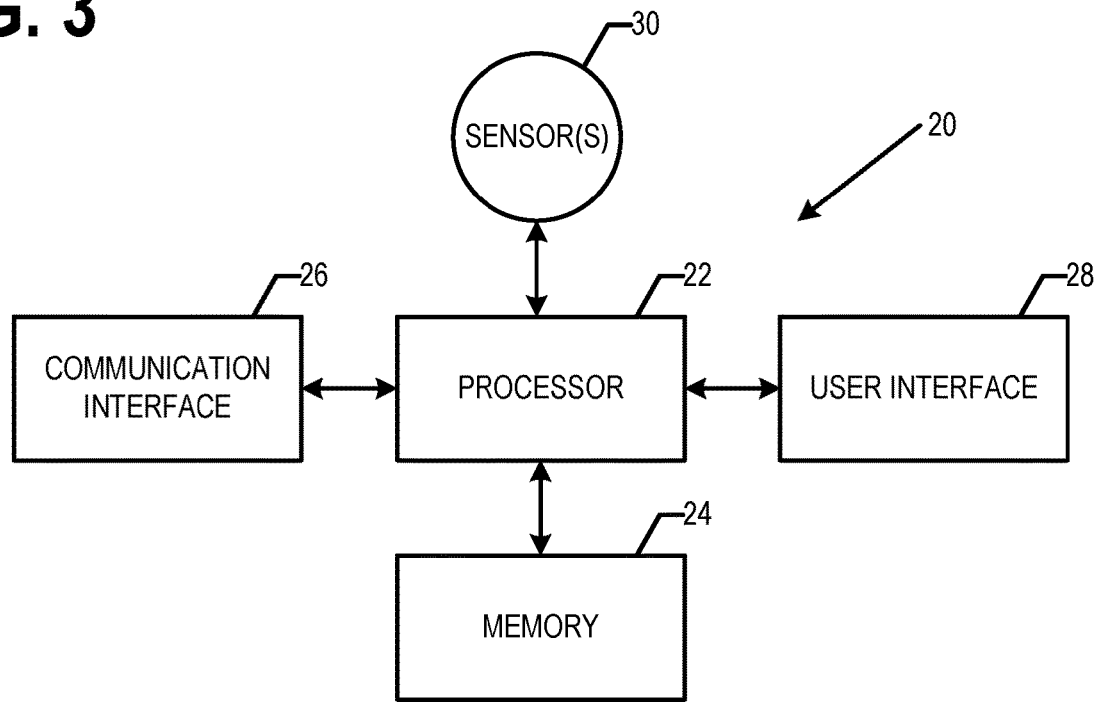
Figure 4:
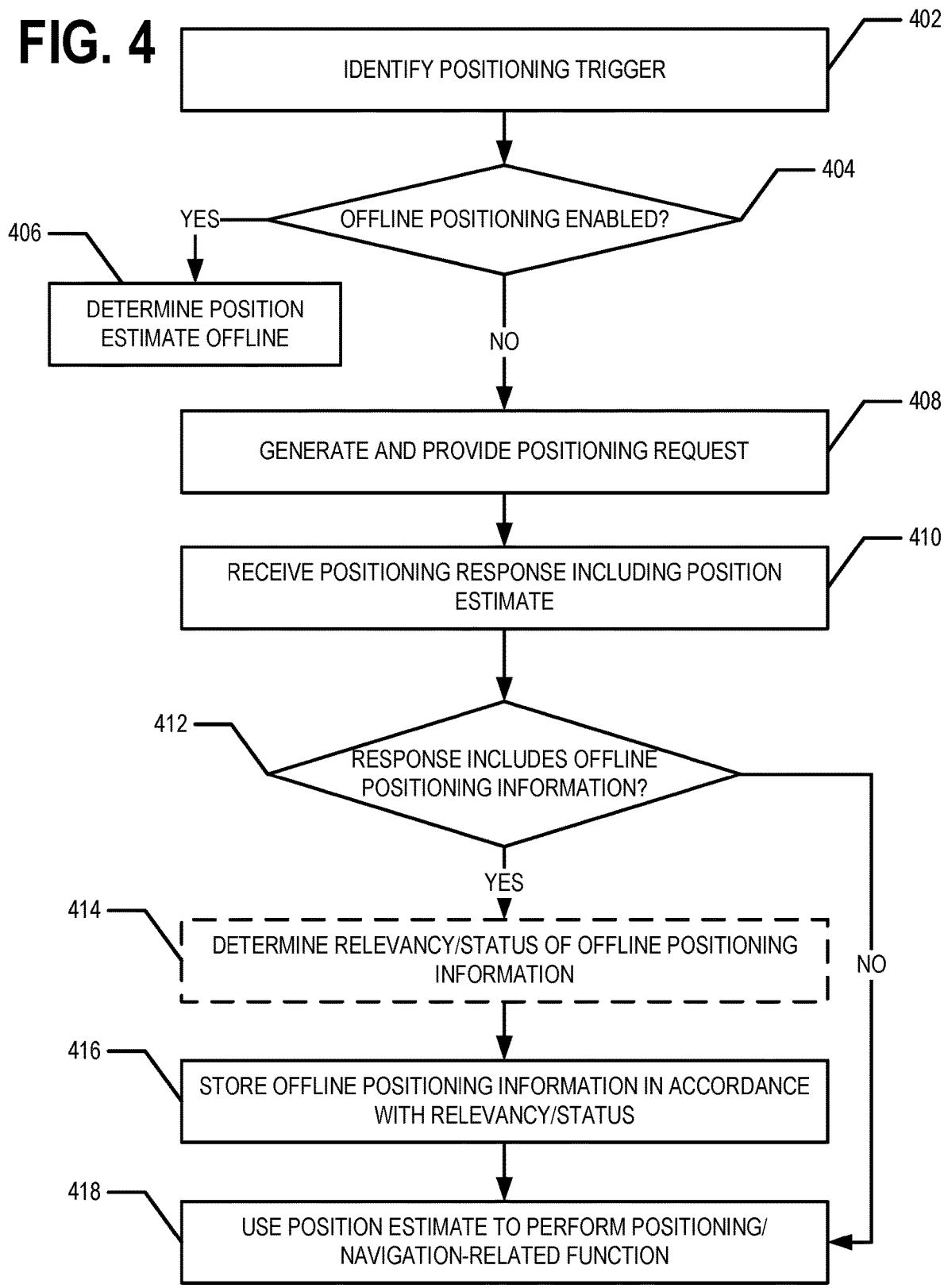
Figure 5:
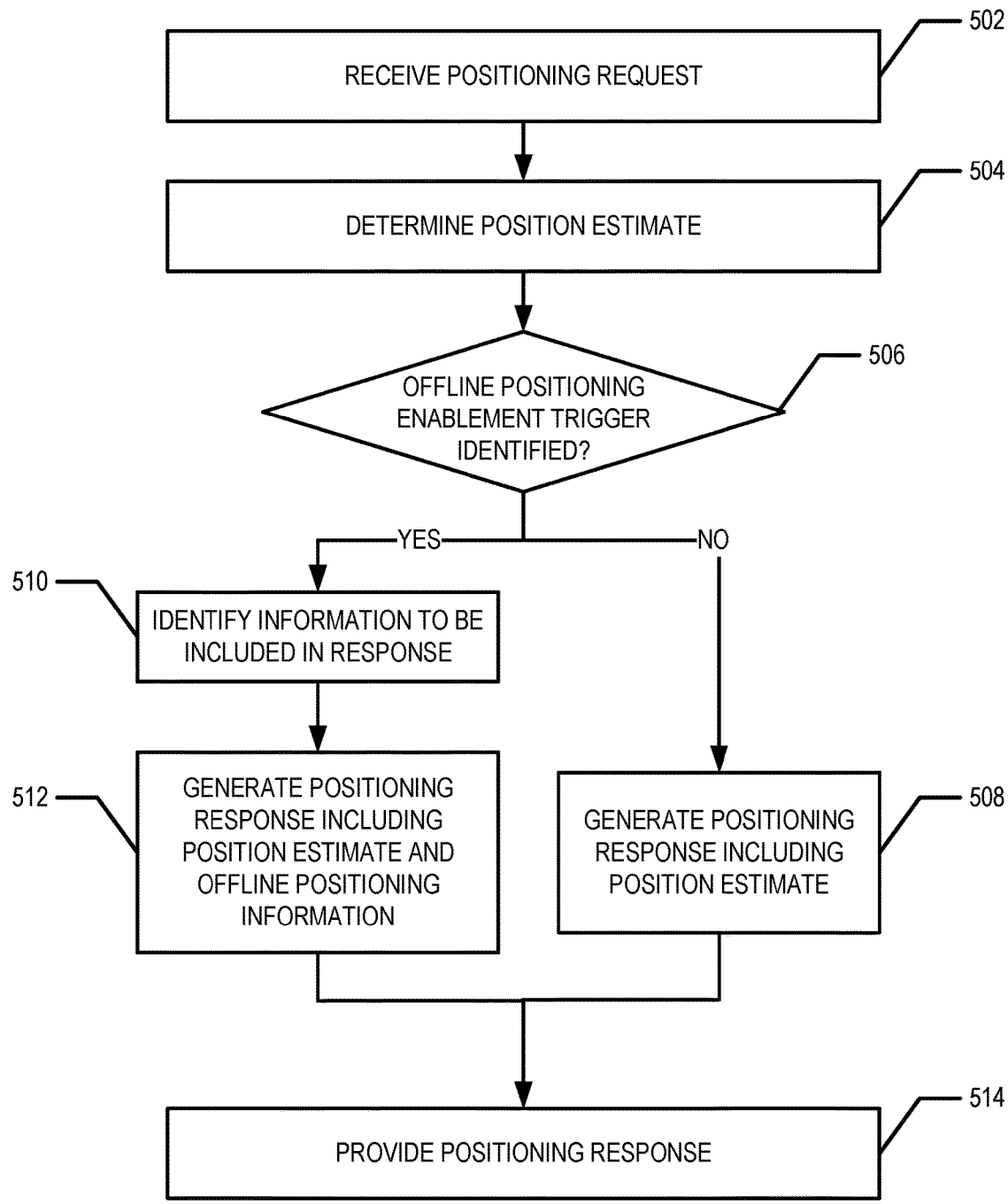

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2 is a block diagram of a network device that may be specifically configured in accordance with an example embodiment;

FIG. 3 is a block diagram of a computing device that may be specifically configured in accordance with an example embodiment;

FIG. 4 is a flowchart illustrating operations performed, such as by the computing device of FIG. 3, in accordance with an example embodiment; and FIG. 5 is a flowchart illustrating operations performed, such as by the network device of FIG. 2, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to selectively enable a computing device to perform offline positioning. For example, a computing device may identify a positioning trigger and provide a positioning request. A network device may receive the positioning request and determine a position estimate for the location of the computing device. The network device may then determine whether an offline positioning enabling trigger corresponding to the computing device has been identified. When the network device determines that an offline positioning enabling trigger has been identified, the network device may generate a positioning response that includes the position estimate for the location of the computing device and information that the computing device may use to perform offline positioning near the computing device's current position. When the network device determines that the offline positioning enabling trigger has not been identified, the network device may generate a positioning response that includes the position of the computing device, but that does not include the information that the computing device may use to perform offline positioning near the computing device's current position.

In various embodiments, the offline positioning enabling trigger may be configured to control a number of positioning requests received by the network device and/or an amount of resources used by the network device to respond to positioning requests. For example, the offline positioning enabling trigger may be configured to control the bandwidth and/or computational resources used by the network device in responding to positioning requests.

In various embodiments, the map (e.g., positioning map, venue map, and/or the like) may then be used to perform one or more positioning-related and/or navigation-related functions. Some non-limiting examples of positioning-related and/or navigation-related functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

In various embodiments, the positioning of the computing device (e.g., the determining of the position estimate indicating a location of the computing device) may be performed based on and/or using a sensor fingerprint generated by aggregating sensor measurements captured by one or more sensors of the computing device. For example a positioning request may include one or more sensor measurements and/or a sensor fingerprint. For example, the sensor measurements and/or sensor fingerprint may be digital image data for use in a visual-based localization. For example, the sensor fingerprint may generated by aggregating sensor measurements corresponding to radio and/or access point observations. In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. For example, for one or more observed access points that are wireless local area network (WLAN) access points, the sensor fingerprint may include basic service set identifiers (BSSIDs) and/or media access control addresses (MAC addresses) configured to identify the one or more access points observed and, possibly, a service set identifiers (SSID) configured to identify a respective access point; a signal strength measurement such as received signal strength index, a physical power (e.g., Rx) level in dBm, and/or other signal strength measurement and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like.

In an example embodiment, the information the information that the computing device may use to perform offline positioning near the computing device's current position is at least a portion (e.g., one or more tiles) of a position map. For example, the positioning map may comprise information/data regarding expected sensor fingerprints and/or that may be used to determine expected sensor fingerprints at various locations. For example, the positioning map may include information/data regarding static visual features that may be observable, the location of one or more access points and/or information/data regarding the coverage area and/or broadcast area of one or more access points, and/or the like. Thus, the computing device may use the at least a portion of the positioning map to determine its location within an area corresponding to the portion of the positioning map. In various embodiments, the positioning map may be an indoor and/or outdoor positioning map.

FIG. 1 provides an illustration of an example system that can be used in conjunction with various embodiments of the present invention. As shown in FIG. 1, the system may include one or more network devices 10, one or more computing devices 20, one or more networks 50, and/or the like. In various embodiments, a computing device 20 may be a user device, probe device, and/or the like. In various embodiments, the computing device 20 may be an in vehicle navigation system, vehicle control system, a mobile computing device, a mobile data gathering platform, IoT device, and/or the like. In various embodiments, the computing device 20 may be a smartphone, tablet, personal digital assistant (PDA), personal computer, desktop computer, laptop, mobile computing device, IoT device, and/or the like. In general, an IoT device is a mechanical and/or digital device configured to communicate with one or more computing devices and/or other IoT devices via one or more wired and/or wireless networks 50. In an example embodiment, the network device 10 is a server, group of servers, distributed computing system, and/or other computing system. For example, the network device 10 may be in communication with one or more computing devices 20 and/or the like via one or more wired or wireless networks 50.

In an example embodiment, a network device 10 may comprise components similar to those shown in the example network device 10 diagrammed in FIG. 2. In an example embodiment, the network device 10 is configured to receive positioning requests, determine a position estimate responsive to receiving a positioning request, determining whether an offline positioning enabling trigger has been identified, generating a positioning response in response to a positioning request comprising the position and, possibly information configured to enable offline positioning, and providing the positioning response. For example, as shown in FIG. 2, the network device 10 may comprise a processor 12, memory 14, a user interface 18, a communications interface 16, and/or other components configured to perform various operations, procedures, functions or the like described herein. In various embodiments, the network device 10 stores a geographical database and/or positioning map (e.g., in memory 14). In at least some example embodiments, the memory 14 is non-transitory.

In an example embodiment, a computing device 20 is a mobile computing entity, IoT device, and/or the like. In an example embodiment, the computing device 20 may be configured to capture, generate, and/or obtain sensor fingerprints, and/or positioning requests; provide (e.g., transmit) the sensor fingerprints and/or positioning requests; receive a position estimate and/or information that enables offline positioning (e.g., at least a portion of a positioning map); perform offline positioning using the information that enables offline positioning; and/or perform one or more positioning-related and/or navigation-related functions based on the position estimate. In an example embodiment, as shown in FIG. 3, the computing device 20 may comprise a processor 22, memory 24, a communications interface 26, a user interface 28, one or more sensors 30 and/or other components configured to perform various operations, procedures, functions or the like described herein. In various embodiments, the computing device 20 stores at least a portion of one or more digital maps (e.g., geographic databases, positioning maps, and/or the like) and/or computer executable instructions for performing one or more positioning-related and/or navigation related functions in memory 24. In at least some example embodiments, the memory 24 is non-transitory.

In various embodiments, the sensors 30 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 30 comprise one or more image sensors configured to capture visual samples, such as digital camera(s), 3D cameras, 360° cameras, and/or image sensors. In various embodiments, the one or more sensors 30 may comprise one or more interfaces, such as radio interfaces, configured to observe and/or receive signals generated and/or transmitted by one or more access points. For example, the one or more interfaces may be configured (possibly in coordination with processor 22) to determine an access point identifier configured to identify the access point that generated and/or transmitted a signal observed by the computing device 20, a signal strength of the signal observed by the computing device 20, a one way or round trip time value for a signal observed by the computing device 20, and/or the like. As used herein, when a computing device 20 observes an access point, the computing device 20 has observed a signal generated and/or transmitted by the access point. In an example embodiment, the interface may be configured to observe one or more types of signals such as generated and/or transmitted in accordance with one or more protocols such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 26. In various embodiments, the sensors 30 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In an example embodiment, a network 50 comprises the automotive cloud, digital transportation infrastructure (DTI), radio data system (RDS)/high definition (HD) radio or other digital radio system, and/or the like. For example, a computing device 20 may be in communication with a network device 10 via the network 50. For example, a computing device 20 may communicate with the network device 10 via a network, such as the Cloud. For example, the Cloud may be a computer network that provides shared computer processing resources and data to computers and other devices connected thereto. For example, the computing device 20 may be configured to provide one or more positioning requests via the network 50. For example, a computing device 20 may be configured to receive a position estimate and/or information to enable offline positioning via the network 50. For example, the network device 10 may configured to receive one or more positioning requests and provide a position estimate and/or information to enable offline positioning via the network 50.

Certain example embodiments of the network device 10 and/or computing device 20 are described in more detail below with respect to FIGS. 2 and 3.

II. Example Operation(s)

Satellite-based (e.g., GNSS) positioning is a common device positioning tool. However, in various scenarios, such as indoors and/or in urban canyons, satellite-based positioning tends to fail and/or to be inaccurate. An example technique for determining a location of a device that does not require use of a satellite-based positioning includes comparing signals (e.g., radio signals) observed by a device to the known locations of access points that generated and/or transmitted the signals. However, such techniques require knowledge of the location of access points and coverage areas where signals generated and/or transmitted by the access points may be observed.

In various scenarios, a computing device 20 may identify a trigger to determine a position estimate for the location of the computing device 20. The computing device 20 may determine to obtain the position estimate using an online positioning mode. For example, the computing device 20 may generate a positioning request comprising sensor measurements and/or a sensor fingerprint and provide the positioning request such that a network device 10 receives the positioning request. The network device 10 may then determine a position estimate for the computing device 20 based at least in part on sensor measurements and/or sensor fingerprint and at least a portion of a positioning map and provide the position estimate such that the computing device 20 receives the position estimate. However, if a large number of computing devices provide positioning requests and/or if a computing device provides a significant number of positioning requests, the bandwidth and/or computational resources of the network device 10 may become overwhelmed. Thus, a technical problem exists to control the number of positioning requests and/or the computational and/or bandwidth resources being used to respond to positioning requests.

Various embodiments provide a technical solution to this technical problem. In particular, when an offline positioning enablement trigger is identified, the network device 10 provides information that enables positioning of the computing device 20 by the computing device itself (e.g., in an offline manner). The offline positioning enablement trigger is configured to control the number of positioning generated by a computing device 20 received by the network device 10 and/or the computational and/or bandwidth resources of the network device 10 used to respond to positioning requests generated by the computing device 20. Thus, the computational resources used by the network device 10 to respond to positioning requests may be controlled and not overwhelmed.

The computing device 20 may determine a relevancy and/or status of the information that enables positioning of the computing device to the computing device and store the information that enables positioning in accordance with the determined relevancy and/or status. For example, when the information that enables positioning corresponds to a geographical area that the computing device visits frequently, the computing device 20 may store the information that enables positioning for a longer period of time than when the information that enables positioning corresponds to a geographical area that the computing device does not visit frequently. Thus, various embodiments further provide technical solutions to the technical problem of storing information enabling offline positioning by the computing device 20 without using a large amount of storage space in the memory 24.

A. Example Operation of a Computing Device

FIG. 4 provides a flowchart illustrating various processes, procedures, operations, and/or the like performed, for example, by a computing device 20, in accordance with an example embodiment. Starting at block 402, a positioning trigger is identified. For example, the computing device 20 may identify a positioning trigger. For example, the computing device 20 may comprise means, such as processor 22, memory 24, communications interface 26, and/or the like, for identifying a positioning trigger. For example, a computing device 20 may be operating an application that, possibly responsive to user input received via user interface 28, identifies a positioning trigger. In another example, a computing device 20 may be accessing an online (e.g., Cloud-based) service that requests the location of computing device 20 and the computing device 20 may identify a positioning trigger. In various embodiments, a positioning trigger is an indication that an application and/or process operating on the computing device 20 and/or by another computing entity (e.g., a Cloud-based application operating on a Cloud server and/or the like) has requested and/or requires the location of the computing device 20 for performing one or more processes.

At block 404, possibly responsive to the identification of the positioning trigger, determines whether the location of the computing device 20 may be determined via an offline technique. For example, computing device 20 may determine whether the computing device 20 is a capable of determining (and/or should) the location of the computing device 20 via an offline technique. For example, the computing device 20 may comprise means, such as processor 22, memory 24, sensors 30, and/or the like, for determining whether the computing device is capable of determining the location of the computing device 20 via an offline technique. As used herein, determining the location of the computing device 20 via an offline technique means that the computing device 20 determines a position estimate of the location of the computing device 20 without submitting a positioning request to a network device 10 (and/or other Cloud-based positioning service). For example, the computing device 20 may determine whether a position estimate may be determined using a GNSS system. For example, the computing device 20 may determine whether the quality and/or accuracy of a position estimate determined using a GNSS system satisfies quality and/or accuracy threshold criteria may be used as the position estimate. However, when the computing device 20 determines that the quality and/or accuracy of a position estimate determined using a GNSS system does not satisfy quality and/or accuracy threshold criteria, the computing device 20 may determine that the computing device 20 cannot determine the position estimate using the GNSS system.

For example, the computing device 20 may determine whether a positioning map (and/or a portion thereof that is expected to correspond to the location of the computing device 20) is stored in memory 24 that may be used for determining the position estimate based on one or more sensor measurements captured by sensors 30 and/or a sensor fingerprint generated by aggregating sensor measurements captured by sensors 30. In an example embodiment, it may be determined whether a positioning map (and/or a portion thereof that is expected to correspond to the location of the computing device 20) that has been updated within a defined time frame is stored in memory 24 that may be used for determining the position estimate based on one or more sensor measurements captured by sensors 30 and/or a sensor fingerprint generated by aggregating sensor measurements captured by sensors 30. For example, if a positioning map (and/or a portion thereof that is expected to correspond to the location of the computing device 20) stored in the memory 24 is more than a month old, two months old, three months old, six months old, one year old, and/or the like, the computing device 20 may determine that the computing device 20 cannot perform the positioning using the positioning map.

When, at block 404, it is determined that the computing device 20 is capable of performing the positioning using an offline technique, the process continues to block 406. At block 406, a position estimate estimating the location of the computing device 20 is determined using an offline technique. For example, the computing device 20 determines a position estimate estimating the location of the computing device 20 using the offline technique. For example, the computing device 20 may comprise means, such as processor 22, memory 24, sensors 30, and/or the like for determining a position estimate estimating the location of the computing device 20 using the offline technique. The position estimate may then be returned to the application or process that generated the identified position trigger.

When, at block 404, it is determined that the computing device 20 is not capable of performing the positioning using an offline technique, the process continues to block 408. At step 408, a positioning request is generated and provided. For example, the computing device 20 may generate a positioning request and provide the positioning request such that a network device 10 receives the positioning request. For example, the computing device 20 may comprise means, such as processor 22, memory 24, communications interface 28, and/or the like, for generating and providing a positioning request such that a network device 10 receives the positioning request. In an example embodiment, the positioning request comprises one or more sensor measurements captured by sensors 30 and/or a sensor fingerprint generated by aggregating one or more sensor measurements captured by sensors 30. In an example embodiment, the positioning request may comprise a previous position estimate estimating a previous location of the computing device 20 and possibly a timestamp indicating the date and/or time when the previous position estimate was determined. In various embodiments, the positioning request may be provided as an application program interface (API) call to a Cloud-based positioning service operated at least in part by and/or associated with the network device 10.

In an example embodiment, prior to generating the positioning request and/or as part of generating the positioning request, the computing device 20 may determine whether a positioning request criteria has been satisfied. For example, the positioning request criteria may correspond to a number of positioning requests corresponding to the computing device 20 generated and provided during a particular time frame, a frequency of positioning requests being generated and provided by the computing device 20 during a particular time frame, a frequency of positioning requests generated and provided by the computing device 20 in a particular geographical area during a particular time frame, a cost (e.g., computational, bandwidth, or currency cost) for the network device 10 to fulfill positioning requests corresponding to the computing device 20 during a particular time period and/or the like. In an example embodiment, when the computing device 20 determines that a positioning request criteria has been satisfied, the computing device 20 may generate a positioning request that includes a flag and/or other indication that the positioning request criteria has been satisfied. In an example embodiment, when the network device 10 reads and/or processes the positioning request, the network device 10 may determine that an offline positioning enablement trigger has been identified based on the flag and/or other indication that the positioning request criteria has been satisfied that is provided by the positioning request.

At block 410, a positioning response responding to the positioning request is received comprising the position estimate estimating the location of the computing device 20. For example, the computing device 20 may receive a positioning response comprising the position estimate estimating the location of the computing device 20. For example, the computing device 20 may comprise means, such as processor 22, memory 24, communications interface 26, and/or the like, for receiving a positioning response comprising position estimate estimating the location of the computing device 20. For example, the network device 10 may determine the position estimate (e.g., based at least in part on the positioning request) and provide a positioning response comprising the position estimate such that the computing device 20 receives the position estimate. In an example embodiment, the positioning response is provided as an API response and/or an API call.

At block 412, it is determined whether the positioning response includes information that enables the use of an offline positioning technique in the vicinity of the position estimate estimating the location of the computing device 20 (e.g., information enabling offline positioning). For example, the computing device 20 may determine whether the positioning response includes information that enables the use of an offline positioning technique in the vicinity of the position estimate estimating the location of the computing device 20. For example, the computing device 20 may comprise means, such as processor 22, memory 24, and/or the like for determining whether the positioning response includes information that enables the use of an offline positioning technique in the vicinity of the position estimate estimating the location of the computing device 20. For example, the information that enables the use of an offline positioning technique in the vicinity of the position estimate may comprise a tile of a positioning map (e.g., the tile of the positioning map used to determine the position estimate), one or more access point models (e.g., including at least one access point model used to determine the position estimate), and/or the like. For example, the information enabling the use of an offline positioning technique in the vicinity of the position estimate may include at least a portion of information (e.g., map information such as a tile of a positioning map and/or one or more records of a geographic database, and/or the like) used to determine the position estimate. In various embodiments, an access point model comprises a two-dimensional and/or three-dimensional position and/or location of the corresponding access point and a description and/or representation of the expected coverage area of the access point. For example, the access point model may describe the coverage area within which signals generated and/or transmitted by the access point are expected to be observable. An example access point model comprises a signal strength image representing the expected signal strength field of signals generated and/or transmitted by the access point.

When, at block 412, it is determined that the positioning response does not include information enabling the use of an offline positioning technique in the vicinity of the position estimate, the process continues to block 418. When, at block 412, it is determined that the positioning response does include information enabling the use of an offline positioning technique in the vicinity of the position estimate, the process may continue to block 414.

At block 414, the relevancy and/or status of the received information enabling the use of an offline positioning technique in the vicinity of the position estimate is determined. For example, the computing device 20 may determine the relevancy of the received information enabling the use of an offline positioning technique in the vicinity of the position estimate to with respect to the computing device 20 and/or the computing device 20 may determine a status of the received information enabling the use of an offline positioning technique in the vicinity of the position estimate. For example, the computing device 20 may comprise means, such as processor 22, memory 24, and/or the like, for determining a relevancy, with respect to the computing device 20, and/or a status of the received information enabling the use of an offline positioning technique in the vicinity of the position estimate.

In an example embodiment, the relevancy of the received information enabling the use of an offline positioning technique in the vicinity of the position estimate with respect to the computing device 20 corresponds to the frequency with which the computing device 20 visits the geographical area corresponding to the received information enabling the use of an offline positioning technique in the vicinity of the position estimate. For example, the received information enabling the use of an offline positioning technique in the vicinity of the position estimate may comprise a tile and/or portion of a positioning map corresponding to a geographical area. The frequency (e.g., multiple times a day, multiple times a week, multiple times a month, once a month, once every couple of months, a few times a year, and/or the like) with which the computing device 20 is determined to be located within the geographical area corresponds to the relevancy of the information enabling the use of an offline positioning technique corresponding to the geographical area with respect to the computing device 20. For example, information corresponding to a geographical area that the computing device 20 is determined to be located within multiple times a week is more relevant to information corresponding to a geographical are that the computing device 20 is determined to be located within once a month. For example, when the received information enabling the use of an offline positioning technique in the vicinity of the position estimate comprises a radio model corresponding to an access point observed by the computing device 20 (e.g., as indicated by the sensor measurements and/or sensor fingerprint included in the positioning request), the coverage area of the radio model may be the geographical area associated with the received information. Thus, the frequency with which the computing device 20 is located within the coverage area indicated by the access point model and/or the computing device 20 observes signals generated and/or transmitted by the access point corresponding to the access point model correspond to the relevancy of the received information with respect to the computing device 20. In an example embodiment, the frequency within the past seven days, the past thirty days, the past sixty days, the past ninety days, and/or the like may be considered.

In an example embodiment, a status of the received information enabling the use of an offline positioning technique in the vicinity of the position estimate may be determined based on metadata associated and provided with and/or as part of the received information enabling the use of an offline positioning technique in the vicinity of the position estimate. For example, the metadata associated with the received information may indicate that the received information is still under development and should only be stored for a limited amount of time (e.g., until a particular date and/or time, for a particular period of time, and/or the like). In another example, the metadata associated with the received information may indicate that the received information is complete and should be considered valid indefinitely, until another update is provided, a predetermined amount of time, until a particular date and/or time when an update is expected, and/or the like. For example, the received information may include an access point model that is still be built, generated, and/or the like. For example, the access point model may include a coverage area that is still being determined, investigated, and/or the like. In such an example, the metadata associated with the access point model may indicate a status of incomplete and/or that the access point model should only be stored and/or relied upon for a short period of time (e.g., the next hour, the next few hours, the current day, the next few days, the next week, and/or the like). In another example, the received information may include an access point model that has been stable and/or has not changed in a significant way for several days, a week, a month, and/or other reasonable amount of time and the metadata associated with the access point model may indicate a status of complete or stabile and/or that the access point model may be stored and/or relied on for a longer period of time.

At block 416, the received information enabling the use of an offline positioning technique in the vicinity of the position estimate is stored. For example, the computing device 20 may store the received information enabling the use of an offline positioning technique in the vicinity of the position estimate in local memory. For example, the computing device 20 may comprise means, such as processor 22, memory 24 and/or the like, for storing the received information enabling the use of an offline positioning technique in the vicinity of the position estimate in local memory (e.g., in memory 24).

In various embodiments, the received information may be stored indefinitely. In various embodiments, the received information may be assigned a defined period of time to live in the local memory (e.g., memory 24). For example, a defined time to live in the local memory for the receive information may be determined based on the determined relevancy and/or status for the received information. For example, in an example embodiment, when the received information has a high relevancy (e.g., the computing device 20 visits the corresponding geographical area very frequently) and/or the received information/data is associated with a status of complete and/or static, the received information may be stored indefinitely in the memory 24 (e.g., until an updated version of the received information is received (e.g., an updated positioning map tile, and updated access point model, and/or the like)). In an example embodiment, when the received information has a high relevancy (e.g., the computing device 20 visits the corresponding geographical area very frequently) and/or the received information/data is associated with a status of complete and/or static, the defined time that the received information is assigned to be stored in the memory 24 may be a relatively long period of time (e.g., a month, multiple months, a year, and/or the like). In an example embodiment, when the received information has a low relevancy (e.g., the computing device 20 visits the corresponding geographical area very infrequently) and/or the received information/data is associated with a status of incomplete and/or unstable, the defined time that the received information is assigned to be stored in the memory 24 may be a relatively short period of time (e.g., a few hours, a day, a week, and/or the like). For example, the defined period of time assigned to received information that is determined to be more relevant and/or more complete/stable is longer than the defined period of time assigned to received information that is determined to be less relevant and/or less complete/stable. In various embodiments, when the defined period of time to live in the local memory assigned to received information expires, the received information may be removed and/or deleted from the local memory, compressed and stored in a compressed manner, and/or the like.

At block 418, the position estimate estimating the location of the computing device 20 may be used to perform a positioning and/or navigation-related function. For example, the computing device 20 may use the position estimate to perform a positioning and/or navigation-related function. For example, the computing device 20 may comprise means, such as processor 22, memory 24, communications interface 26, user interface 28, and/or the like, for using the position estimate to perform a positioning and/or navigation-related function. Some non-limiting examples of positioning and/or navigation-related functions include localization, (vehicular and/or pedestrian) route determination, lane level route determination, operating a vehicle along a lane level route, route travel time determination, lane maintenance, (vehicular and/or pedestrian) route guidance, lane level route guidance, provision of traffic information/data, provision of lane level traffic information/data, vehicle and/or device trajectory determination and/or guidance, vehicle speed and/or handling control, route and/or maneuver visualization, provision of safety alerts, and/or the like. For example, the position estimate may be returned to the application or process that generated the identified position trigger.

B. Example Operation of a Network Device

FIG. 5 provides a flowchart illustrating various processes, procedures, operations, and/or the like that may be performed by a network device, for example, in accordance with various embodiments. For example, the processes, procedures, operations, and/or like shown in FIG. 5 may be performed between blocks 408 and 410 of the flowchart shown in FIG. 4. Starting at block 502, a positioning request is received. For example, the network device 10 may receive a positioning request. For example, the network device 10 may comprise means, such as processor 12, memory 14, communications interface 16, and/or the like, for receiving a positioning request. For example, the computing device 20 may generate a positioning request and provide the positioning request such that the network device 10 receives the positioning request. In an example embodiment, the positioning request comprises one or more sensor measurements captured by sensors 30 and/or a sensor fingerprint generated by aggregating one or more sensor measurements captured by sensors 30 of the computing device 20. In an example embodiment, the positioning request may comprise a previous position estimate estimating a previous location of the computing device 20 and possibly a timestamp indicating the date and/or time when the previous position estimate was determined. In various embodiments, the positioning request may be provided as an application program interface (API) call to a Cloud-based positioning service operated at least in part by and/or associated with the network device 10.

At block 504, a position estimate is determined. For example, the network device 10 may determine a position estimate estimating the location of the computing device 20. For example, the network device 10 may comprise means, such as processor, 12, memory 14, and/or the like, for determining a position estimate estimating the location of the computing device 20. For example, the position estimate may be determined responsive to receiving and/or processing the positioning request. For example, the position estimate may be determined based on the data provided in the positioning request. For example, the position estimate may be determined based on at least a portion of the sensor measurements captured by sensors 30 and/or a sensor fingerprint generated by aggregating one or more sensor measurements captured by sensors 30 of the computing device 20. For example, the sensor measurements and/or sensor fingerprint may be digital image data and/or feature information extracted from digital image data for use in a visual-based localization. For example, the sensor fingerprint may be generated by aggregating sensor measurements corresponding to radio and/or access point observations. In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. The network device 10 may use a positioning map comprising feature information corresponding to visually identifiable features and/or access point models that are associated with locations to determine the position estimate. For example, the network device 10 may query a positioning map and/or a geographical database comprising access point models to determine a position estimate associated with the sensor measurements and/or sensor fingerprint provided in the positioning request.

At block 506, it determined whether an offline positioning enablement trigger has been identified. For example, the network device 10 may determine whether an offline positioning enablement trigger has been identified. For example, the network device 10 may comprise means, such as processor 12, memory 14, and/or the like, for determining whether an offline positioning enablement trigger has been identified. In various embodiments, the offline positioning enablement trigger is configured to control the number of positioning generated by a computing device 20 received by the network device 10 and/or the computational and/or bandwidth resources of the network device 10 used to respond to positioning requests generated by the computing device 20.

For example, in an example embodiment, when the positioning requests corresponding to and/or generated and provided by the computing device 20 and received by the network device 10 satisfy a positioning request criteria, it may be determined that the offline positioning enablement trigger has been identified. For example, determining whether the offline positioning enablement trigger has been identified may comprise determining whether the positioning requests received by the network device 10 that correspond to the computing device 20 satisfy a positioning request criteria. In various embodiments, the positioning request criteria may be a frequency criteria. For example, when the frequency of positioning requests received by the network device 10 and corresponding to the computing device 20 in a particular time period (e.g., the past minute, five minutes, ten minutes, half an hour, hour, day, and/or the like) meets and/or exceeds a frequency threshold, it may be determined that the positioning request criteria has been satisfied and the offline positioning enablement trigger may be identified. In another example, when the frequency of visits by the computing device 20 to a particular area (e.g., a geographical area corresponding to a tile of a positioning map or a coverage area of a radio model) meets and/or exceeds a frequency threshold, it may be determined that the positioning request criteria has been satisfied and the offline positioning enablement trigger may be identified. In various embodiments, the positioning request criteria may be a number criteria. For example, when the number of positioning requests received by the network device 10 and corresponding to the computing device 20 in a particular time period (e.g., the present calendar day, the past 24 hours, the present week, the past seven days, the present month, the past thirty days, and/or the like) meets and/or exceeds a particular number, it may be determined that the positioning request criteria has been satisfied and the offline positioning enablement trigger may be identified. In various embodiments, the positioning request criteria may be a cost criteria. For example, when the cost (e.g., computational cost/usage, bandwidth cost/usage, currency and/or fiat currency cost, and/or the like) of fulfilling positioning requests received by the network device 10 and corresponding to the computing device 20 in a particular time period (e.g., the present calendar day, the past 24 hours, the present week, the past seven days, the present month, the past thirty days, and/or the like) meets and/or exceeds a cost threshold, it may be determined that the positioning request criteria has been satisfied and the offline positioning enablement trigger may be identified. In various embodiments, the positioning request criteria may be a combination of frequency, number, cost criteria, and/or other criteria corresponding to fulfilling positioning requests generated and/or provided by the computing device 20.

For example, in an example embodiment, when a frequency of positioning requests corresponding to and/or generated and provided by the computing device 20 and received by the network device 10 within a particular time frame is equal to or greater than a frequency threshold, it may be determined that the offline positioning enablement trigger has been identified. For example, determining whether the offline positioning enablement trigger has been identified may comprise determining a frequency of positioning requests received by the network device 10 during a particular time frame (e.g., the past minute, five minutes, ten minutes, half an hour, hour, day, and/or the like) that correspond to the computing device 20 and determining whether the determined frequency of positioning requests received by the network device 10 that correspond to the computing device 20 is equal to and/or exceeds a frequency threshold.

For example, in an example embodiment, when the number of positioning requests corresponding to and/or generated and provided by the computing device 20 and received by the network device 10 within a particular time frame amount to at least a particular number of positioning requests, it may be determined that the offline positioning enablement trigger has been identified. For example, determining whether the offline positioning enablement trigger has been identified may comprise determining a number of positioning requests received by the network device 10 during a particular time frame (e.g., the present calendar day, the past 24 hours, the present week, the past seven days, the present month, the past thirty days, and/or the like) that correspond to the computing device 20 and determining whether the determined number of positioning requests received by the network device 10 that correspond to the computing device 20 is equal to and/or exceeds a particular number.

For example, in an example embodiment, when a cost of fulfilling positioning requests corresponding to and/or generated and provided by the computing device 20 and received by the network device 10 within a particular time frame is equal to or greater than a cost threshold, it may be determined that the offline positioning enablement trigger has been identified. For example, determining whether the offline positioning enablement trigger has been identified may comprise determining a cost (e.g., computational cost/usage, bandwidth cost/usage, currency and/or fiat currency cost, and/or the like) of fulfilling positioning requests received by the network device 10 during a particular time frame (e.g., the present calendar day, the past 24 hours, the present week, the past seven days, the present month, the past thirty days, and/or the like) that correspond to the computing device 20 and determining whether the determined cost of fulfilling positioning requests received by the network device 10 that correspond to the computing device 20 is equal to and/or exceeds a cost threshold.

In various embodiments, a positioning request corresponds to the computing device 20 when the computing device generated and provided the positioning request. For example, each computing device 20 may be considered individually with regard to evaluation of the positioning request criteria. In an example embodiment, two or more computing devices 20 may be associated within one another such that positioning requests provided by each of the two or more computing devices 20 are considered during evaluation of the positioning criteria. For example, computing device A and computing device B may be owned and/or operated by the same entity, be contractually associated with one another, be associated with a same user and/or consumer profile, and/or the like. In an example embodiment, when determining whether an offline positioning request responsive to receiving a positioning request generated and provided by computing device A, the frequency, number, cost, and/or other criteria regarding to fulfilling positioning requests generated and/or provided by both computing device A and computing device B may be considered. In another example embodiment, when determining whether an offline positioning request responsive to receiving a positioning request generated and provided by computing device A, the frequency, number, cost, and/or other criteria regarding to fulfilling positioning requests generated and/or provided by only computing device A may be considered.

In an example embodiment, the network device 10 identifies the offline positioning enablement trigger. For example, the network device 10 may determine whether positioning request criteria have been satisfied. In an example embodiment, the computing device 20 may identify the offline positioning enablement trigger and provide an indication that the offline positioning enablement trigger has been identified as part of the positioning request. For example, the computing device may determine whether positioning request criteria have been satisfied prior to and/or during the generation of the positioning request. Responsive to determining that positioning enablement criteria have been satisfied, the computing device 20 may generate a positioning request including a flag and/or other indication that a positioning enablement criteria has been satisfied. the network device 10 may then determine whether an offline positioning enablement trigger has been identified based on the flag and/or other indication, provided in the positioning request, that a positioning enablement criteria has been satisfied.

Continuing with FIG. 5, when, at block 506, it is determined that an offline positioning enablement trigger has not been identified, the process continues to block 508. At block 508, a positioning response responding to the positioning request is generated that includes the determined position estimate. For example, the network device 10 may generate a positioning response that includes the determined position estimate estimating the location of the computing device 20. For example, the network device 10 may comprise means, such as processor 12, memory 14, and/or the like, for generating a positioning response that includes the determined position estimate.

When, at block 506, it is determined that an offline positioning enablement trigger has been identified, the process continues to block 510. At block 510, the information enabling offline positioning to be included in the positioning response responding to the positioning request is determined and/or identified. In various embodiments, the determined and/or identified information enabling offline position enables offline positioning in the vicinity of the position estimate estimating the location of the computing device 20. In particular, the determined and/or identified information enabling offline position enables offline positioning in the vicinity of the position estimate is information that was or could have been used to determine the position estimate at block 504. In other words, the information enabling offline positioning in the vicinity of the position estimate is information that enables use of an offline positioning technique in a particular geographical area (e.g., a geographical area corresponding to a portion/tile of a positioning map, a coverage area of an access point as indicated by a corresponding access point model, and/or the like) and the position estimate is located within the particular geographical area.

In various embodiments, the network device 10 may determine and/or identify the information enabling offline positioning to be included in the positioning response. For example, the network device 10 may comprise means, such as processor 12, memory 14, and/or the like, for determining and/or identifying the information enabling offline positioning to be included in the positioning response to the positioning request. In various embodiments, information enabling offline positioning that is determined and/or identified to be included in the positioning response to the positioning request comprises the portion (e.g., one or more tiles) of a positioning map and/or one or more access point models used to determine the position estimate at block 504.

In an example embodiment, all of the portion (e.g., one or more tiles) of the positioning map used to determine the position estimate are determined and/or identified for inclusion in the positioning response. As noted above, in various embodiments, a positioning map comprises a plurality of access point models. In an example embodiment, all of the access point models used to determine the position estimate are determined and/or identified for inclusion in the positioning response. In an example embodiment, the information used and/or that was possible to use to determine the position estimate (e.g., the portion (e.g., one or more tiles) of the positioning map and/or access point models) may be filtered using one or more filtering criteria to determine and/or identify the information enabling offline positioning to be included in the positioning response. For example, the information used and/or that was possible to use to determine the position estimate may be filtered to not include redundant information. For example, the information used and/or that was possible to use to determine the position estimate may be filtered to remove access point models that are similar and/or that have similar and/or overlapping coverage areas. For example, the information used and/or that was possible to use to determine the position estimate may be used to only include the n access point models that have the shortest (Euclidean) distance to and/or strongest expected signal strength at the location of the position estimate, where n is an integer equal to or greater than one. In an example embodiment, identifiers identifying the radio models previously provided to the computing device 20 may be stored in a profile associated with the computing device 20 (e.g., the same profile used to track the number, frequency, and/or cost associated with fulfilling positioning requests corresponding to the computing device 20). The information used and/or that was possible to use to determine the position estimate may be filtered to reduce and/or prevent the sending of redundant information/access point models. For example, if an access point model corresponding to access point A that has not yet expired was previously provided to the computing device 20, any access point model corresponding to access point A may be filtered out of the information enabling offline positioning provided in the positioning response.

For example, the information used and/or that was possible to use to determine the position estimate may be filtered to remove radio models associated with a status of incomplete, unstable, and/or the like. For example, the information used and/or that was possible to use to determine the position estimate may be filtered to only include access point models having metadata associated with the access point model that indicates a status of complete or stabile and/or that the access point model may be stored and/or relied on for a longer period of time. In various embodiments, the information used and/or that was possible to use to determine the position estimate may be filtered based on a frequency of use (by the network device 10 in general and/or by the network device 10 in fulfilling positioning requests generated and provided by the computing device 20) of the access point models that were used and/or that correspond to a geographical area including the position estimate (e.g., the position estimate is within the coverage area of the access point model). For example, a first access point model used more frequently (by the network device 10 in general and/or by the network device 10 in fulfilling positioning requests generated and provided by the computing device 20) may be included in the information enabling offline positioning provided in the positioning response, while a second access point model that is used less frequently than the first access point model may not be included in the information enabling offline positioning provided in the positioning response. In an example embodiment, the information used and/or that was possible to use to determine the position estimate may be filtered based on a cost of use (e.g., computational cost, bandwidth cost, currency and/or fiat currency cost) associated with the access point model. For example, a first access point model having a lower cost of use may be included in the information enabling offline positioning provided in the positioning response, while a second access point model that has a higher cost of use compared to the first access point model may not be included in the information enabling offline positioning provided in the positioning response. In an example embodiment, an importance score may be determined for one or more access point models of the information used and/or that was possible to use to determine the position estimate and the information used and/or that was possible to use to determine the position estimate may be filtered to determine and/or identify the information enabling offline positioning to be included in the positioning response based on the determined importance score(s). For example, the importance score for an access point model may be determined based on whether or not the access point model was used to determine the position estimate; the accuracy in the position estimate enabled by the access point model; a confidence level of the accuracy, veracity, and/or stability of the access point model; a frequency of use of the access point model in determining position estimates; a distance from the location of the corresponding access point and/or a signal strength of the access point at the position estimate according to the access point model and/or the sensor fingerprint; and/or the like.

In various embodiments, filtering the information used and/or that was possible to use to determine the position estimate when determining and/or identifying the information enabling offline positioning to be provided in the positioning response reduces the amount of bandwidth used while also reducing the amount of memory the computing device 20 uses to store the information enabling offline positioning provided in the positioning response.

At block 512, a positioning response responding to the positioning request is generated that includes the determined position estimate and the determined and/or identified information enabling offline positioning. For example, the network device 10 may generate a positioning response that includes the determined position estimate estimating the location of the computing device 20 and the determined and/or identified information enabling offline positioning in the vicinity of the position estimate. For example, the network device 10 may comprise means, such as processor 12, memory 14, and/or the like, for generating a positioning response that includes the determined position estimate and the determined and/or identified information enabling offline positioning. In an example embodiment, the network device 10 may use the position estimate to perform a positioning and/or navigation-related function and a result of the positioning and/or navigation-related function may be included in the positioning response.

At block 514, the positioning response is provided. For example, the network device 10 may provide (e.g., transmit) the positioning response. For example, the network device 10 may comprise means, such as processor 12, memory 14, communications interface 16, and/or the like, for providing the positioning response. In an example embodiment, the positioning response is provided such that the commuting device 20 that generated and provided the positioning request receives the positioning response responding to the positioning request. In an example embodiment, the positioning response is provided as an API response or an API call.

III. Technical Advantages

Various embodiments provide technical solutions to the technical problems of controlling the number of positioning requests and/or the computational and/or bandwidth resources being used to respond to positioning requests. For example, when fulfilling a positioning request generated by a computing device 20, a network device 10 may determine whether an offline positioning enablement trigger corresponding to the computing device 20 has been identified. When it is determined that an offline positioning enablement trigger has been identified, the network device 10 provides information enabling offline positioning of the computing device 20 by the computing device itself (e.g., in an offline manner). The offline positioning enablement trigger is configured to control the number of positioning requests generated by a computing device 20 received by the network device 10 and/or the computational and/or bandwidth resources of the network device 10 used to respond to positioning requests generated by the computing device 20. Thus, the computational resources used by the network device 10 to respond to positioning requests may be controlled and not overwhelmed.

The computing device 20 may determine a relevancy and/or status of the information that enables positioning of the computing device to the computing device and store the information that enables positioning in accordance with the determined relevancy and/or status. For example, when the information that enables positioning corresponds to a geographical area that the computing device visits frequently, the computing device 20 may store the information that enables positioning for a longer period of time than when the information that enables positioning corresponds to a geographical area that the computing device does not visit frequently. Thus, various embodiments further provide technical solutions to the technical problem of storing information enabling offline positioning by the computing device 20 without using a large amount of storage space in the memory 24.

In various embodiments, the network device 10 may filter the information and/or access point models included in the information enabling offline positioning to reduce and/or prevent the sending of redundant information. In an example embodiment the network device 10 may filter the information and/or access point models included in the information enabling offline positioning to provide information and/or access point models that is expected to be the most helpful and/or least resource intensive for the computing device 20. Thus, the bandwidth used to provide the positioning response comprising the information enabling offline positioning may be reduced and/or controlled and the amount of space in the memory 24 used to store the information enabling offline positioning may be reduced. Thus, various embodiments provide technical solutions to technical problems related to the use computational, memory, and/or bandwidth resources for performing positioning functions.

IV. Example Apparatus

The network device 10 and/or computing device 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, an Internet of things (IoT) item, and/or other device that can perform positioning and/or navigation-related functions, such as digital routing and map display. Additionally or alternatively, the network device 10 and/or computing device 20 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a computing device 20 is a smartphone, tablet or other mobile device and a network device 10 is a server. In an example embodiment, a computing device 20 is an apparatus configured to provide a user with a route (e.g., via user interface 28).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or computing device 20 may be embodied by a computing entity and/or device. However, in some embodiments, the network device 10 and/or computing device 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10 and/or computing device 20 may include a user interface 18, 28 that may, in turn, be in communication with the processor 12, 22 to provide output to the user, such as one or more navigable routes through a road network and/or venue, one or more notifications regarding traffic conditions along at least a portion of a route, and/or the output of one or more other navigation functions, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network device 10 and/or computing device 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network device 10 and/or computing device 20 of an example embodiment, a navigation system may also include or have access to a geographic database. For example, in various embodiments, a network device 10 and/or computing device 20 may comprise a component (e.g., memory 14, 24, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to TMEs, links, lanes, road segments, travel lanes of road segments, nodes, intersection, pedestrian walkways, elevators, staircases, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, or paths, as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network device 10 and/or device 20 in accordance with an example embodiment may determine the time to traverse a route that includes one or more turns at respective intersections more accurately.

V. Apparatus, Methods, and Computer Program Products

As described above, FIGS. 4 and 5 illustrate flowcharts of a network device 10 and/or computing device 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by a network device, a positioning request associated with a computing device;
   determining, by the network device, a position estimate of the computing device responsive to the positioning request and based at least in part on at least a portion of a positioning map;
   determining, by the network device, whether an offline positioning enablement trigger has been identified based at least in part on one or more of (i) a number of positioning requests corresponding to the computing device that have been received by the network device within a particular time frame or (ii) a cost associated with responding to positioning requests during the particular time frame;
   responsive to determining that the offline positioning enablement trigger has been identified, generating, by the network device, a positioning response that comprises the position estimate and information enabling offline positioning of the computing device at least at a location of the position estimate; and
   providing, by the network device, the positioning response such that the computing device receives the positioning response.

2. The method of claim 1, wherein the information enabling offline positioning of the computing device at least at the location of the position estimate comprises at least part of the at least a portion of the positioning map.

3. The method of claim 1, further comprising determining the information enabling offline positioning by filtering information of the at least a portion of the positioning map based on at least one of (a) a status associated with each respective access point model, (b) an importance score of each respective access point model in determining the position of the computing device, (c) a frequency of use of each respective access point model, (d) a cost of use of each respective access point model, (e) access point models previously provided such that the computing device received the access point models, or (f) based on a comparison of coverage areas of at least two of the one or more access point models.

4. The method of claim 1, wherein the at least a portion of the positioning map comprises one or more access point models.

5. The method of claim 4, wherein an access point model of the one or more access point models comprises at least one of (a) a location of a corresponding access point, (b) a description of a coverage area of the corresponding access point, (c) an expected path loss for a signal generated by the corresponding access point, or (d) an expected signal strength for the signal generated by the corresponding access point.

6. The method of claim 1, wherein identifying the offline positioning enablement trigger comprises determining that the positioning request comprises an indication that a positioning request criteria corresponding to the computing device has been satisfied.

7. The method of claim 1, wherein identifying the offline positioning enablement trigger comprises determining that a positioning request criteria corresponding to the computing device has been satisfied.

8. The method of claim 1, wherein identifying the offline positioning enablement trigger comprises determining at least one of (a) that at least a particular number of positioning requests corresponding to the computing device have been received within the particular time frame or (b) that the cost associated with responding to positioning requests corresponding to the computing device during the particular time frame satisfies a cost threshold criteria.

9. The method of claim 1, wherein the computing device stores the information enabling offline positioning in local memory for use in one or more positioning-related functions.

10. The method of claim 1, wherein the computing device assigns the information enabling offline positioning a short-time-to-live in local memory for use in one or more positioning-related functions.

11. The method of claim 10, wherein the information enabling offline positioning comprises a flag indicating that the information enabling offline positioning comprises an incomplete or unstable access point model and the information enabling offline positioning is assigned the short-time-to-live in the local memory based on the flag.

12. The method of claim 10, wherein the information enabling offline positioning is assigned the short-time-to-live in the local memory based at least in part on a frequency with which the computing device visits a geographical area corresponding to the information enabling offline positioning.

13. An apparatus comprising at least one processor, at least one memory storing computer program code, and a communications interface, the at least one memory and the computer program code are configured to, with the processor, cause the apparatus to at least:

receive, via the communications interface, a positioning request associated with a computing device;

determine a position estimate of the computing device responsive to the positioning request and based at least in part on at least a portion of a positioning map;

determine whether an offline positioning enablement trigger has been identified based at least in part on one or more of (i) a number of positioning requests corresponding to the computing device that have been received by the network device within a particular time frame or (ii) a cost associated with responding to positioning requests during the particular time frame;

responsive to determining that the offline positioning enablement trigger has been identified, generate a positioning response that comprises the position estimate and information enabling offline positioning of the computing device at least at a location of the position estimate; and provide, via the communications interface, the positioning response such that the computing device receives the positioning response.

14. The apparatus of claim 13, wherein the information enabling offline positioning of the computing device at least at the location of the position estimate comprises at least part of the at least a portion of the positioning map.

15. The apparatus of claim 13, wherein the at least a portion of the positioning map comprises one or more access point models.

16. The apparatus of claim 13, further comprising determine the information enabling offline positioning by filtering information of the at least a portion of the positioning map based on at least one of (a) a status associated with each respective access point model, (b) an importance score of each respective access point model in determining the position of the computing device, (c) a frequency of use of each respective access point model, (d) a cost of use of each respective access point model, (e) access point models previously provided such that the computing device received the access point models, or (f) based on a comparison of coverage areas of at least two of the one or more access point models.

17. The apparatus of claim 13, wherein identifying the offline positioning enablement trigger comprises determining at least one of (a) that the positioning request comprises an indication that a positioning request criteria has been satisfied or (b) determining that a positioning request criteria has been satisfied.

18. The apparatus of claim 13, wherein the computing device stores the information enabling offline positioning in local memory for use in one or more positioning-related functions.

19. The apparatus of claim 13, wherein the computing device assigns the information enabling offline positioning a short-time-to-live in local memory for use in one or more positioning-related functions.

20. The apparatus of claim 19, wherein the information enabling offline positioning is assigned a short-time-to-live in the local memory based least in part on at least one of (a) the information enabling offline positioning comprising a flag indicating that the information enabling offline positioning comprises an incomplete or unstable access point model or (b) a frequency with which the computing device visits a geographical area corresponding to the information enabling offline positioning.

\* \* \* \* \*